United States Patent [19]
Tsunoda et al.

[11] Patent Number: 5,597,615
[45] Date of Patent: Jan. 28, 1997

[54] EXTRUSION COATING METHOD AND COATING APPARATUS FOR COATING BOTH SIDES OF A WEB

[75] Inventors: Eizo Tsunoda, Komoro; Yutaka Shimizu, Saku; Naomi Yoshiike, Nagano-ken; Katsumi Onozawa, Saku; Kazuo Katai, Saku; Eiichi Watanabe, Saku, all of Japan

[73] Assignee: TDK Corporation, Tokyo, Japan

[21] Appl. No.: 359,828

[22] Filed: Dec. 20, 1994

[30] Foreign Application Priority Data

Dec. 28, 1993 [JP] Japan .................................. 5-349101

[51] Int. Cl.⁶ .............................. B05D 3/12; B05D 3/02; B05C 5/02
[52] U.S. Cl. ......................... 427/172; 427/130; 427/131; 427/209; 427/356; 118/68; 118/410; 118/411
[58] Field of Search .............................. 118/68, 410, 411; 427/130, 131, 172, 209, 356, 372.2

[56] References Cited

U.S. PATENT DOCUMENTS

| | | | |
|---|---|---|---|
| 4,796,557 | 1/1989 | Shibata et al. | 118/411 |
| 4,854,262 | 4/1989 | Chino et al. | 427/356 |
| 4,911,951 | 3/1990 | Ogawa et al. | 427/131 |
| 5,173,119 | 12/1992 | Watanabe et al. | 118/410 |
| 5,206,056 | 4/1993 | Shibata et al. | 118/419 |

FOREIGN PATENT DOCUMENTS

| | | |
|---|---|---|
| 0325206 | 7/1989 | European Pat. Off. . |
| 0329424 | 8/1989 | European Pat. Off. . |
| 0388818 | 9/1990 | European Pat. Off. . |
| 4011279 | 10/1990 | Germany . |

OTHER PUBLICATIONS

English Abstract of Japanese Patent 57-84771; May 27, 1982; "Coater"; Yasunori Tanaka et al.
English Abstract of Japanese Patent 58-109162; Jun. 29, 1983; "Coating Device"; Yasunori Tanaka.
English Abstract of Japanese Patent 60-238179; Nov. 27, 1985; "Coating Apparatus"; Tokuo Shibata, et al.
English Abstract of Japanese Patent 62-244469; Oct. 24, 1987; "Apparatus for Absorbing Vibration of Web"; Tokuo Shibata, et al.
English Abstract of Japanese Patent 62-247861; Oct. 28, 1987; "Coating Method"; Tokuo Shibata, et al.

Primary Examiner—Katherine Bareford
Attorney, Agent, or Firm—Oblon, Spivak, McClelland, Maier & Neustadt, P.C.

[57] ABSTRACT

An extrusion coating head which is disposed between a drier for performing a non-contact drying operation and a support roll located at the upstream side of and nearest to the drier is designed so that a back edge surface thereof is designed to have an round surface having a radius of curvature R which satisfies the following inequality: 3 mm≦R≦30 mm, and the entire R-surface portion of the back edge of the coating head is located at a position higher than a tangential line drawn to the front edge surface at a slit-side edge point of the front edge so as to project toward the web side. The running web is coated with the coating liquid by the extrusion-type coating head, and then dried through a non-contact drying process.

27 Claims, 3 Drawing Sheets

EXTRUSION COATING METHOD AND COATING APPARATUS FOR COATING BOTH SIDES OF A WEB

BACKGROUND OF THE INVENTION

1. Field of the Invention

This invention relates to a coating method and a coating apparatus, and particularly to a coating method capable of uniformly coating both sides of a web with a coating liquid, and a coating apparatus therefor.

2. Description of Related Art

Various kinds of coating methods such as a roll coat method, a gravure coat method, a slide bead coat method, a doctor coat method, etc. have been conventionally used as a method of coating liquid on a web. Of these methods, an extrusion coating method has recently attracted public attention thereto because it has high productivity, excellent operating performance and has excellent controllability of the thickness of coated films.

In the extrusion coating method, a coating liquid is coated on a web using a coating head while a front edge surface (at the upstream side of the web feeding direction) and a back edge surface (at the downstream side of the web feeding direction) of the coating head are pushed against the web between web feeding means such as a pair of support rolls or the like so that predetermined tension is applied to the web. In this case, the clearance between the back edge surface and the web is controlled to vary in accordance with variation of an extrusion amount of the coating liquid which is extruded through a slit of the coating head, thereby setting the thickness of the coating liquid on the web to a desired one.

In order to perform an uniform coating operation on a web using the extrusion coating method as described above, a coating apparatus in which the back edge surface (at the downstream side of the web feeding direction) of a coating head is designed to have a triangular shape in section was proposed, and this apparatus is disclosed in Japanese Laid-open Patent Application No. 57-84771. Further, Japanese Laid-open patent application No. 58-109162 discloses a coating apparatus in which proper restriction is imposed on an angle at which each of the front edge surface and the back edge of the coating head intersects to a line connecting the apexes of the edges of both faces at the slit side, and Japanese Laid-open Patent Application No. 60-238179 also discloses a coating apparatus in which the back edge surface (at the downstream side of the web feeding direction) of the coating head is curved and an intersecting angle between the back edge surface and the front edge surface or the like is restricted.

When the coating liquid is coated on both sides of a web using the extrusion-type coating head as described above, the double-coated web cannot be supported at both sides thereof in contact with a support roll or the like, and thus the web must be dried in a drying apparatus using a non-contact drying treatment (process) in which air is blown against both sides of the web to support the web in a non-contact state. However, in the non-contact drying process as described above, vibrations are induced in the web even when the balance of air blown against the web is minutely varied. The vibration thus induced affects the coating head which is located nearest to the non- contact drying apparatus, resulting in unevenness of the thickness of the coated film. Therefore, it is difficult to perform a uniform double-side coating operation to obtain uniform thickness on the whole surface of the web.

In order to solve the above problem there has been proposed a vibration absorbing device which has two air ejection chambers each containing a distributor and which serves to form thin air films on both sides of a web. In this case, the vibration absorbing device is disposed between the non-contact drying apparatus and the coating head located nearest the non-contact drying apparatus, and vibration induced in the web is absorbed by the non-contact drying operation, thereby preventing the coating operation of the coating head from being disturbed by the vibrations (see Japanese Laid-open Patent Application No. 62-244469). In addition, a solid smoother is further disposed between the vibration absorbing device as described above and the coating head so as to be in contact with the coated film of the web (see Japanese Laid-open Patent Application No. 62-247861).

However, the coating apparatus as disclosed in Japanese Laid-open Patent Application No. 57-84771 has the following problem. That is, the back edge surface (at the downstream side of the web feeding direction) has a triangular shape in section, and thus it has an apex (in section). Therefore, it is difficult for dust or foreign matter to flow out beyond the apex, and thus streaking on a coated film is liable to occur due to the dust or foreign matter which is trapped at the outlet of a slit which is provided in the coating head applying the coating liquid to the web.

Further, the coating apparatus as disclosed in the Japanese Laid-open Patent Application No. 58-109162 and the coating apparatus as disclosed in the Japanese Laid-open Patent Application No. 60-238179 have a problem that these coating apparatuses are liable to be adversely affected by vibrations occurring in the web through the non-contact drying process and thus it is difficult to form a uniform coated film. Therefore, it is required that the vibration absorbing device and the solid smoother as disclosed in the Japanese Laid-open Patent Application Nos. 62-244469 and 62-247861 are disposed between the non-contact drying apparatus and the coating head. However, in this case the manufacturing cost is increased because surplus equipment such as the vibration absorbing device and the solid smoother must be provided. In addition, when the solid smoother is contacted with the coated film on the first surface of the web for the double-side coating operation as disclosed in the Japanese Laid-open Patent Application No. 62-247861, the contact between the solid smoother and the coated film induces variation of the thickness of the coated film on the first surface of the web.

Still further, in the double-side coating technique as disclosed in the Japanese Laid-open Patent Application No. 58-109162. two coating heads are respectively disposed on the both sides of the web in an area where the tension of the web is controlled, and thus it is difficult to properly distribute desired web tension to each coating head. In addition, the angle adjustment between each coating head and the web cannot be independently and solely performed for each coating head, so that a coated film having optimum thickness cannot be uniformly formed on both sides of the web.

SUMMARY OF THE INVENTION

An object of the present invention is to provide a coating method and coating apparatus in which a coated film can be uniformly formed without suffering an adverse effect due to vibrations occurring in a web due to a non-contact drying operation.

In order to attain the above object, according to a first aspect of the present invention, the coating method of the present invention comprises the steps of disposing an extrusion type coating head between a drier for performing a non-contact drying operation and a support roll which is located at the upstream side of the drier and nearest to the drier, the extrusion type coating head having such a structure that a back edge surface of the extrusion-type coating head is designed to have a round or curved surface (hereinafter referred to an "R-surface") which has the radius of curvature R satisfying the following inequality: 3 mm$\leq$R$\leq$30 mm, and the whole R-surface portion of the back edge of the coating head is located at a position higher than a tangential line drawn to the front edge surface at a slit-side edge point of the front edge so as to project toward the web side, coating the running web with coating liquid from at least the extrusion type coating head, and then performing the non-contact drying operation with the drier after the coating of the coating liquid on the running web.

Further, according to another aspect of the present invention, a coating apparatus of the present invention includes a web feeding device, a drier for performing a non-contact drying operation, and an extrusion type coating head which is disposed between the drier and a support roll which is located at the upstream side of the drier and nearest to the drier, the extrusion type coating head having a back edge surface which is designed to have an R-surface having radius of curvature R which satisfies the following inequality: 3 mm$\leq$R$\leq$30 mm, and the whole R-surface portion of the back edge of the coating head is located at a position higher than a tangential line drawn to the front edge surface at a slit-side edge point of the front edge so as to project toward the web side.

According to the present invention, the coating operation can be uniformly performed while suffering no effect of vibration occurring in the web due to the non-contact drying operation. Even when the coating is required to be conducted on both sides of a web, the coating can be simultaneously performed on both sides of the web, and thus it is not necessary to individually and repetitively carry out the coating operation on each of both sides of the web, totally twice. Accordingly, the number of steps can be reduced, and in addition the yield can be improved. Furthermore, equipment such as a vibration absorbing device for excluding the vibration occurring in the web due to the non-contact drying operation, a solid smoother, etc. are not required, so that the manufacturing cost can be reduced.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

A preferred embodiment according to the present invention will be described hereunder with reference to the accompanying drawings.

Figure 1:
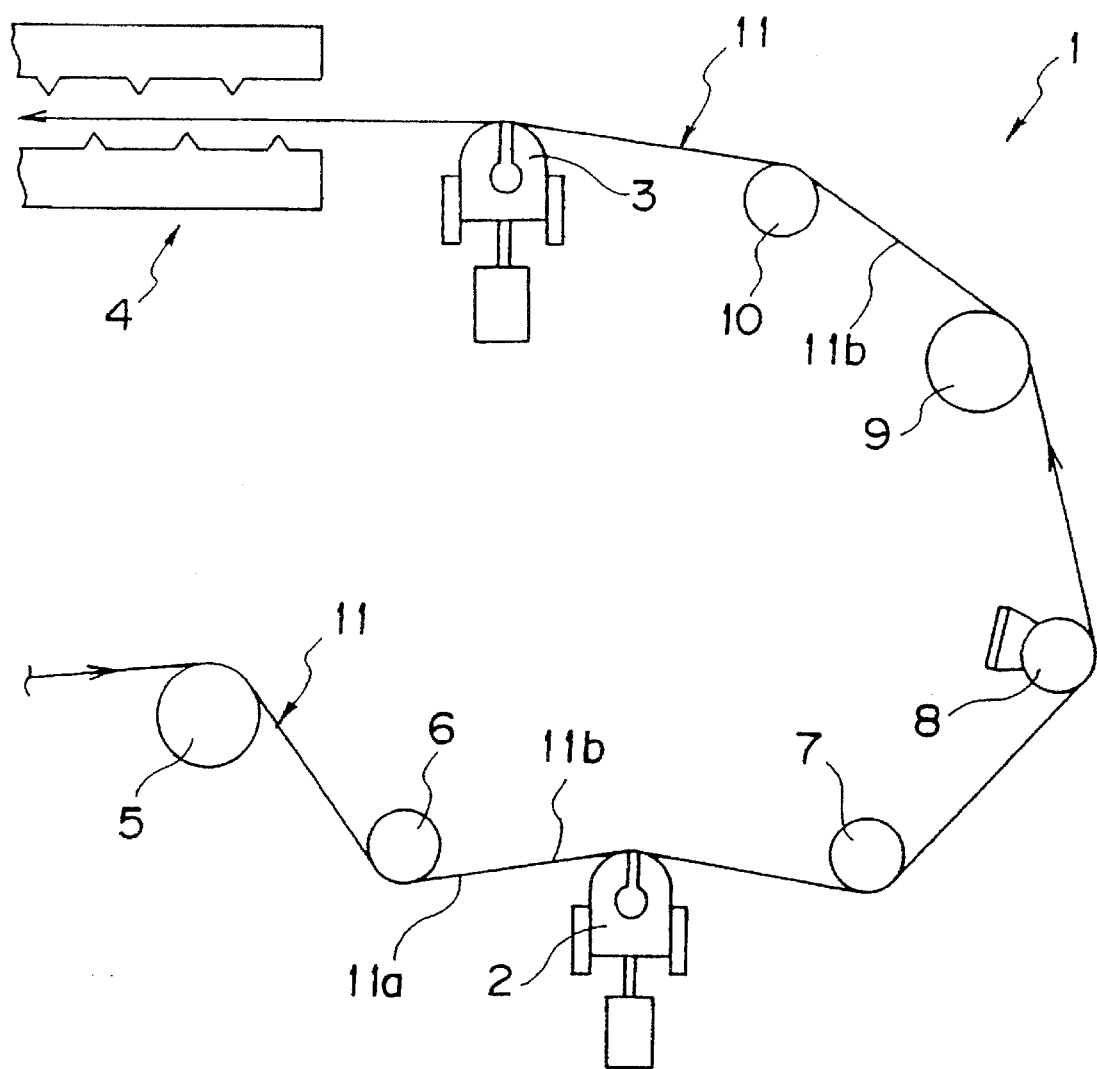
FIG. 1 is a schematic diagram showing a coating apparatus of an embodiment according to the present invention.

FIG. 1 is a schematic view showing an embodiment of a coating apparatus according to the present invention.

As shown in FIG. 1, the coating apparatus 1 is a double-side coating type coating apparatus including a extrusion-type of first coating head 2, an extrusion-type of second coating head 3 and a non-contact drying apparatus (e.g. an air-float drier) 4. The coating apparatus 1 further includes a vacuum roll 5 and a support roll 6 which are disposed at the upstream side of the first coating head 2, and a support roll 7, a tension detection roll 8, a vacuum roll 9 and a support roll 10 are successively disposed in this order between the first coating head 2 and the second coating head 3.

In the coating apparatus 1, the vacuum roll 5 and the vacuum roll 9 constitutes a tension adjusting means, and tension which is to be applied to a web 11 at the time when a first coating liquid is coated on a first surface 11$a$ by the first coating head 2 can be adjusted by adjusting the tension of a web feeding path extending from the vacuum roll 5 to the vacuum roll 9.

Further, a dancer roll and/or vacuum roll (not shown) disposed at the downstream side of the drier 4 and the vacuum roll 9 constitutes another tension adjusting means, and tension which is to be applied to the web 11 at the time when a second coating liquid is coated on a second surface 11$b$ by the second coating head 3 can be adjusted by adjusting the tension of the web feeding path extending from the vacuum roll 9 to the downstream side thereof. With this arrangement, the tension of the web 11 in a first coating section in which the coating head 2 is disposed and in a second coating section in which the coating head 3 is disposed can be set individually and independently of each other.

If the first coating head 2 and the second coating head 3 are designed to be contacted with and separated from the web 11, the lap angle between the web 11 and each of the first coating head 2 and the second coating head 3 can be set individually and independently. Alternately, the first coating head 2 and the second coating head 3 may be designed to be rotatable around the rotational axis which is parallel to the transverse direction of the web 11 to set the lap angle between the web 11 and each of the first coating head 2 and the second coating head 3 individually and independently. Further, by combining the contacting and separating motion and the rotational motion of the first and second coating heads 2 and 3 for the web 11 with each other, the lap angles of the first and second coating head 2 and 3 may be set independently of each other. Further, the support roll 6, the support roll 7 and the support roll 10 may be designed to be contacted with and separated from the web 11. In order to move the coating head and the support rolls so as to be contacted with or separated from the web or rotate the coating head, an air cylinder, a hydraulic cylinder, an electric motor or the like may be used.

In the coating apparatus 1 thus constructed, at least the second coating head 3 has a back edge surface which is designed with an R-surface shape to have the radius of curvature R satisfying the following inequality: 3 mm$\leq$R$\leq$30 mm and the whole R-surface portion of the back edge of the coating head is located at a position higher than a tangential line drawn to the front edge surface at a slit-side edge point of the front edge so as to project toward the web side.

Figure 2:
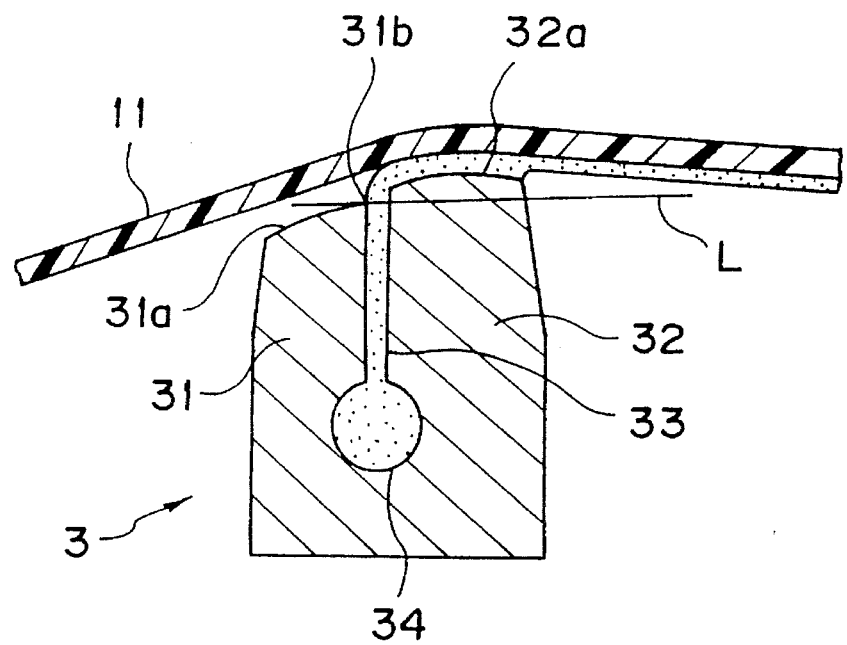
FIG. 2 is a cross-sectional view showing a coating head constituting the coating apparatus shown in FIG. 1.
Figure 3:
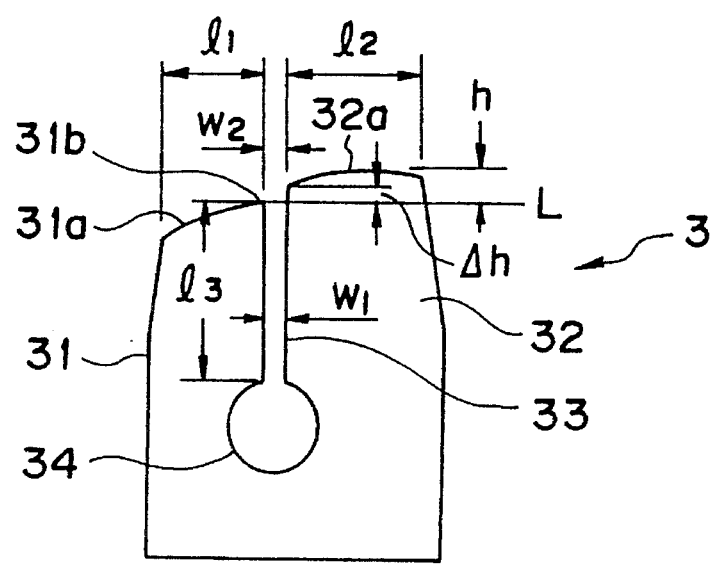
FIG. 3 is a cross-sectional view showing the detailed structure of the coating head shown in FIG. 2.

FIGS. 2 and 3 are cross-sectional views showing the second coating head 3.

In FIGS. 2 and 3, the second coating head 3 comprises a front edge 31 located at the upstream side of the web feeding direction, a back edge 32 located at the downstream side of the web feeding direction, a slit portion 33 formed between the front edge 31 and the back edge 32 and a pocket portion 34. In this invention, the back edge surface 32a (corresponding to the upper end surface of the back edge 32) of the second coating head 3 is designed in an R-surface shape and the R-surface portion of the back edge 32 of the second coating head 3 is located at a position higher than a tangential line L which is drawn to the front edge surface 31a (corresponding to the upper end surface of the front edge 31) at a slit-side edge point 31b of the front edge surface 31a so as to project toward the web side.

The radius of curvature R of the R-surface portion of the back edge surface 32a upstream of the drier and facing the web is set to any value in the range of 3 mm≦R≦30 mm. If the radius of curvature R of the R-surface portion is less than 3 mm, the lap angle range at which the coating can be performed is reduced because of scrape-off of the coating liquid from the web by the back edge 32 which occurs at such a small radius of curvature or the like. On the other hand, if the radius of curvature R of the R-surface portion is more than 30 mm, the unevenness in thickness of the coated film is liable to occur due to deformation of the web such as "one-side stretch" (which is defined as a phenomenon that one of both sides of a web is stretched under overtension and thus it is slackened (waved) at the one side of the web), and in this case the range of the lap angle at which the coating can be performed is also narrow. The length $l_2$ of the back edge 32 (in the length in the web feeding direction) is set to about 0.2 to 3 mm. preferably about 0.4 to 2 mm. Here, the flow direction of the coating liquid through the slit 33 is set as a reference line, and then two lines are drawn parallel to the reference line at both edge points of the back edge surface 32a. In this case, the distance between the parallel lines is defined as the length of the back edge 32 as shown in FIG. 3. Further, the height h of the R-surface portion of the back edge surface 32a at which the whole R-surface portion is upwardly projected toward the web side from the tangential line L is set to about 20 to 300 μm, and the height Δh at which the slit-side edge point of the back edge 32 is projected from the tangential line L toward the web side (that is, the distance between the tangential line L and the slit-side edge point of the back edge 32) is set to about 0 to 100 μm.

The slit portion 33 is designed to have a slit-gap width $w_1$ of about 0.05 to 0.6 mm, and serves as a flow path for the coating liquid, which is transversely formed in the second coating head 3 (vertical to the web feeding direction). The flow-path length $l_3$ of the slit portion 33 may be set in accordance with the components and physical properties of the coating liquid, the supply amount of the coating liquid, etc. The width $w_2$ of the outlet of the slit portion 33 which is formed between the front edge surface 31a and the back edge surface 32a is generally set to be equal to the slit-gap width $w_1$, however, it may be set to a different value if occasion demands.

The second coating head 3 as described above may be formed of the same material as a conventional extrusion-type coating head, for example, stainless steel, tungsten-carbide or the like.

In the second coating head 3 as described above, the coating liquid is supplied from coating liquid supply means (not shown) into the pocket portion 34. The supply of the coating liquid into the pocket portion 34 may be performed through any portion of the pocket 34, for example, through one end portion of the pocket portion 34, through both end portions of the pocket portion 34 or through a middle portion of the pocket portion 34. The coating liquid supplied to the pocket portion 34 is extruded through the slit portion 33 from the outlet of the slit portion 33, and continuously supplied into a gap between the back edge surface 32a and the running web 11. At this time, the gap between the web 11 and the back edge surface 32a is set in accordance with the supply amount of the coating liquid, the tension of the web to the coating head, the lap angle, etc., and the coating liquid is coated on the web 11.

Figure 4:
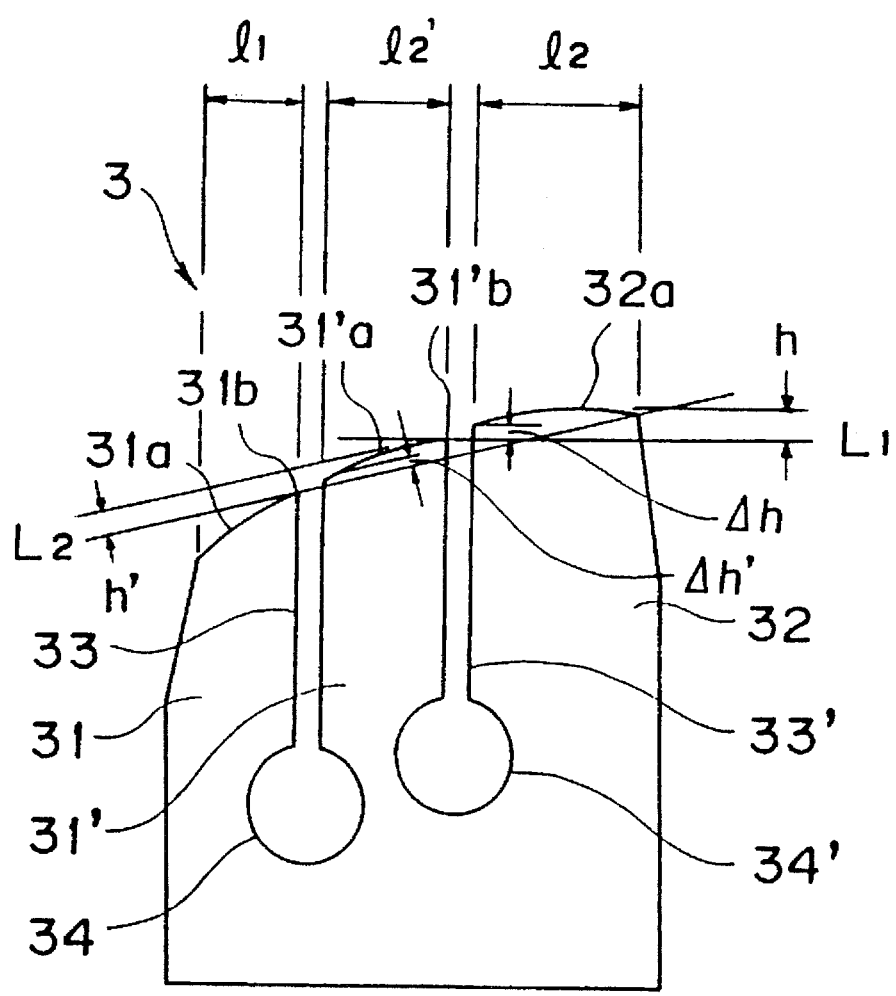
FIG. 4 is a cross-sectional view showing another coating head used in the coating apparatus shown in FIG. 1.

In place of the structure as described above, a coating head for a multi-layer (double-layer in FIG. 2) simultaneous coating operation as shown in FIG. 4 may be used as the second coating head. The second coating head 3 shown in FIG. 4 includes a front edge 31, a center edge 31', a back edge 32, slit portions 33, 33' and pocket portions 34, 34'. In the second coating head 3 thus constructed, the back edge surface 32a which is the upper end surface of the back edge 32 is designed in an R-surface shape and the R-surface portion of the back edge 32 is projected toward the web side from a tangential line L, which is drawn to the center edge surface 31'a (which is the upper end surface of the center edge 31') at the edge point 31'b of the slit portion 33' side of the center edge 31'. Further, the center edge surface 31'a is designed in an R-surface shape and the R-surface portion of the center edge surface 31'a is projected toward the web side from a tangential line $L_2$ which is drawn to the front edge surface 31a (which is the upper surface of the front edge 31) at the edge point 31b of the slit portion 33 side of the front edge 31.

The radius of curvature R of the R-surface portion of the back edge 32 is set to any value in the rage of 3 mm≦R≦30 mm, preferably in the range of 13 mm≦R≦30 mm. Further, the radius of curvature R of the R-surface portion of the center edge 31' is set to any value in the range of 3 mm≦R≦30 mm, preferably in the range of 3 mm≦R≦10 mm.

The length $l_2$ of the back edge 32 and the length $l_2'$ of the center edge 31' are set to about 0.2 to 3 mm. Preferably, the total length of the edges ($l_2+l_2'$) is set to 0.4 to 4 mm. Here, the length $l_2$, $l_2'$ of each edge is defined as follows. The flow direction of the coating liquid through the slit at the most downstream side in the coating head (slit 33' in FIG. 4) is set as a reference line, and two lines are drawn at both edge points of each edge in parallel to the reference line. The distance between the parallel lines for each edge is defined as the length of the edge. Further, the height h at which the whole R-surface portion of the back edge 32 is projected toward the web side from the tangential line $L_1$ and the height h' at which the whole R-surface portion of the center edge 31' is projected toward the web side from the tangential line $L_2$ are respectively set to about 20 to 300 μm. Preferably, the total height (h+h') are set to 40 to 400 μm. Further, the height (distance) Δh between the tangential line $L_1$ and the edge point of the back edge 32 at the slit 33' side and the height (distance) Δh' between the tangential line $L_2$ and the edge point of the center edge 31' at the slit 33 side are respectively set to about 0 to 100 μm, and preferably the total height (Δh+Δh') is set to 0 to 150 μm.

In this invention, the first coating head may be the same type of extrusion coating head as the second coating head, or it may be a conventional extrusion-type coating head or a coating head using a different coating method such as a roll coat method or the like. Further, a smoothing means such as a solid smoother or the like may be disposed at the downstream side of the first coating head and at the upstream side of the second coating head.

Next, the coating method of the present invention will be described with reference to FIGS. 1 to 3.

In the coating apparatus shown in FIG. 1, the web 11 is fed from a supply roll (not shown) through the vacuum roll 5 and the support roll 6 to the first coating head 2, and the first coating head 2 coats the coating liquid on the first surface 11a which is one surface of the web 11. Subsequently, the web 11 is further fed to the second coating head 3 while the other non-coated surface (second surface 11b) of the web 11 is supported by the support roll 7, the tension detection roll 8, the vacuum roll 9 and the support roll 10, and the coating liquid is coated on the non-coated second surface 11b by the second coating head 3.

The second coating head 3 as described above is disposed between the drier 4 and the support roll 10 which is located at the upstream side of the drier 4 and nearest to the drier 4, and the coating liquid which is extruded through the slit portion 33 from the outlet of the slit portion 33 is coated on the web 11 with keeping the gap between the back edge surface 32a and the web 11 being fed.

In the coating method of the present invention, the second coating head is designed so that the back edge surface 32a thereof has the R-surface portion and the R-surface portion of the back edge is projected toward the web 11 beyond the tangential line L which is drawn to the front edge surface 31a at the slit-side edge point of the front edge 31. Accordingly, even when the web 11 is vibrated in the air-float drier 4, the gap between the back edge surface 32a and the web 11 can be kept stable. In addition, scraping of the web 11 by the front edge surface 31a is prevented, and unevenness of the coating liquid on the web hardly occurs due to vibrations of the web 11 when the coating is carried out by the second coating head 3, so that an uniform coated film can be formed.

After the second surface 11b (the other surface) of the web is coated by the second coating head 3 as described above, the coated films coated on both sides of the web 11 can be dried in the drier 4 while supported in the non-contact state, and then it can be taken up by a take-up roll (not shown).

Further, in the coating method as described above, the tension applied to the web 11 in the first coating section in which the first coating operation is performed by the first coating head 2 (i.e., the tension at the coating time of the first coating head 2) and the tension applied to the web 11 in the second coating section in which the second coating operation is performed by the second coating head 3 (i.e., the tension at the coating time of the second coating head 3) can be set individually and independently of each other. That is, the tension of the web in the first coating section extending from the vacuum roll 5 to the vacuum roll 9 is adjustable by the vacuum rolls 5 and 9. Likewise, the tension of the web 11 in the second coating section extending from the vacuum roll 9 to the downstream side of the vacuum roll 9 is adjustable by the vacuum roll 9 and the dancer roll and/or vacuum roll (not shown) located at the downstream side of the drier 4. By adjusting, individually and independently, the tension of the web 11 in each of the first and second coating section, the tension of the web 11 in the second coating section can be adjusted to a proper value while the tension of the web 11 in the first coating section is kept to an optimum value, whereby the second coating operation of the second coating head can be prevented from being adversely affected by the vibration occurring in the web 11 in the air-float drier 4.

The tension of the web 11 in the second coating section is preferably set to be equal to or smaller than that of the web 11 in the first coating section. If the tension of the web 11 in the second coating section is excessively large, the drier 4 exists in the same section in which the second coating head 3 is disposed, so that thermal contraction occurs after the drying process. This induces skew or tracking error when coated products are magnetic tapes or magnetic floppy discs, for example. Usually, the tension of the web 11 in the second coating section is set to about 5 to 50 kg/m.

Further, in the coating method according to the present invention, the lap angle between the first coating head 2 and the web 11 and the lap angle between the second coating head 3 and the web 11 may be adjusted individually and independently of each other. For example, if the coating liquid to be coated by the second coating head 3 has lower viscosity than the coating liquid to be coated by the first coating head 2, the lap angle of the second coating head 3 is preferably set to be equal to or larger than the lap angle of the first coating head 2.

The coating apparatus of the present invention is not limited to the above embodiment. For example, even for a double-side coating type, a multilayer-coating can be performed on each side of a web by disposing a plurality of coating heads. In this case, the coating head which is located at the upstream side of and nearest to the air-float drier may be designed to have the same structure as the second coating head 3 as described above. Further, for a one-coating type, if only one coating head is used, the coating head may be designed to have the same structure as the second coating head 3 as described above.

The web used in this invention may be formed of a plastic film such as a polyethylene terephthalate film or the like, a longitudinal flexible support such as a paper or a metal foil, or similar materials, and no specific restriction is imposed on the web. The web may be provided with various processed layers in advance.

Any material may be used as the coating liquid used in this invention insofar as it is suitable for the coating by the extrusion-type coating head. The extrusion-type coating method is excellent in controllability of the thickness of a coated film, and thus it has been applied to fields which require the uniform and stable film coating (film thickness). For example, it is applied to formation of magnetic recording layers or back coat layers for magnetic recording medium, and magnetic coating liquid containing magnetic powder, binder and solvent or coating liquid for back coat may be used in this invention.

As the magnetic powder may be used oxide fine powder such as $\gamma$-$Fe_2O_3$, Co-contained $\gamma$-$Fe_2O_3$, $Fe_3O_4$, Co-contained $Fe_3O_4$, $CrO_2$, barium ferrite, strontium ferrite, etc., metals such as Fe, Co, Ni or alloy fine powder of these metals, iron carbide, etc. Further, as the binder may be used various kinds of well-known resin binders. No special restriction is imposed on the solvent. For example, ketonbased solvent such as cyclohexanone, methyl ethyl ketone, methyl isobutyl ketone or the like, aromatic-based solvent such as toluene or the like may be suitably selectively used in accordance with its use purpose.

The magnetic coating liquid may be added with inorganic fine particles, various kinds of additives such as lubricant, etc. if occasion demands. The magnetic recording layer which is formed using the magnetic coating liquid as described above is formed at a thickness of about 0.1 to 6 μm in dry state, and the occupational rate of the magnetic powder in the magnetic recording layer is preferably set to 30 to 92 wt %. Further, the multilayer-coating can be performed in a wet state of a coated layer on a web, which has been recently frequently used. In this case, the coating liquid is not limited to the magnetic liquid, and it may be any material such as a non-magnetic liquid, solution of resin or the like insofar as it is suitably used for the extrusion-type coating head. The layer structure of the coating layer may be varied in accordance with its use purpose.

The following materials may be used for the coating liquid for the back coat. As pigment, one may use a non-magnetic inorganic powder such as carbon black, a $\alpha\text{-}Fe_2O_3$, $TiO_2$, $CaO$, $SiO_2$, $Cr_2O_3$3, $\alpha\text{-}Al_2O_3$, $SiC$, $CaCO_3$, $BaSO_4$, $ZnO$, $MgO$, boron nitride, $TiC$ or the like. As a binder, one can use any kind of resin binder. Further, no restriction is imposed on solvent. For example, keton-based solvent such as cyclohexanone, methyl ethyl ketone, methyl isobutyl ketone or the like, aromatic-based solvent such as toluene or the like may be suitably selectively used in accordance with its use purpose. The coating liquid for the back coat may be added with inorganic fine particles, various kinds of additives such as lubricant, etc. if occasion demands. The back coat layer which is formed using the back-coat coating liquid as described above is formed at a thickness of about 0.1 to 1.0 μm in dry state, and the occupational rate of the pigment in the back-coat layer is preferably set to 30 to 80 wt %.

Next, this invention will be described in greater detail referring to some embodiments.

Polyethylene terephthalate films having 520 mm width and 14 μm thickness were prepared, and a magnetic coating liquid and back-coat coating liquid having the following components were prepared.

(Components of magnetic coating liquid)

| | |
|---|---|
| Co-contained $\gamma\text{-}Fe_2O_3$ | 100 parts by weight |
| vinyl chloride-acrylate copolymer containing polar group | 15 parts by weight |
| polyurethane resin containing sulfonic acid group | 6 parts by weight (in terms of solid) |
| dispersant | 1.5 part by weight |
| stearic acid | 1 part by weight |
| butyl stearate | 1 part by weight |
| α-alumina | 2 parts by weight |
| methyl ethyl ketone | 160 parts by weight |
| toluene | 40 parts by weight |
| cyclohexanone | 100 parts by weight |
| hardener (C-3041 NV50% produced by Nippon Polyurethane Co., Ltd.) | 8.4 parts by weight |

(Components of coating liquid for back coat)

| | |
|---|---|
| carbon black (center particle diameter 21 nm) | 80 parts by weight |
| copolymer of vinyl chloride-vinyl acetate-vinyl alcohol | 65 parts by weight |
| polyurethane resin containing sulfonic acid group | 35 parts by weight |
| methyl ethyl ketone | 470 parts by weight |
| toluene | 470 parts by weight |
| cyclohexanone | 470 parts by weight |
| stearic acid | 1 part by weight |
| myristic acid | 1 part by weight |
| butyl stearate | 2 parts by weight |
| hardener (C-3041 NV50% produced by Nippon Polyurethane Co., Ltd.) | 30 parts by weight |

EMBODIMENT 1

Using the double-side coating type of coating apparatus 1 shown in FIG. 1, the magnetic coating liquid as described above was coated on the first surface 11a of the web 11 by an extrusion-type of first coating head 2 having the shape as described below, and then the coating liquid for back coat was further coated on the second surface 11b of the web 11 by an extrusion-type of second coating head 3 having the shape as shown in table 1. Thereafter, the web was dried in the air-float drying process to form a magnetic recording medium having a magnetic recording layer on the first surface 11a of the web 11 and a back coat layer on the second surface 11b of the web 11. The coating operation as described above was performed under the following conditions, and the web tension and the lap angle for each of the first and second coating heads were set as shown in the table 1.

(Coating Conditions)

| | |
|---|---|
| web feeding speed | 300 m/minute |
| extrusion amount of first coating head (apparent viscosity at 3000 $sec^{-1}$ = 75 cp) | 2000 cc/minute |
| extrusion amount of second coating head (apparent viscosity at 3000 $sec^{-1}$ = 9 cp) | 1200 cc/minute |
| shape of first coating head | |
| radius of curvature | R = 5 mm |
| projection height of back edge | $\Delta h$ at slit-side edge point h = +40 μm |
| projection height h of R-surface portion of back edge | h = 210 μm |
| length $l_2$ of back edge = 0.75 mm | |

Unevenness in coating was measured for the back-coat layer of the magnetic recording medium as described above by the following method, and the measurement result is shown in the table 1.

(Measuring Method for Coating Unevenness)

The magnetic recording medium was sampled along the transverse and longitudinal direction of the web. The sampled magnetic recording medium was subjected to a recording-layer removing treatment with methyl ethyl ketone. Thereafter, the unevenness in thickness (%) of the back coat layer was measured in accordance with the following equation within the measuring length of 520 mm by a near-infrared-rays transmission type of thickness detector (IRT-200 type: spot diameter of 15 mm, produced by Japan Sensor Co., Ltd.), and a larger one of two values of coating unevenness (%) in the two directions was adopted as a coating unevenness value (%).

coating unevenness (%)=(variation of thickness) / (average thickness)×100

EMBODIMENTS 2 AND 3, COMPARATIVE EXAMPLE 1

The magnetic recording media were prepared in the same manner as the first embodiment using the second coating head in which Δh was varied as shown in the table 1, and the coating unevenness of the back coat layers were measured. The measurement results are shown in the table 1.

EMBODIMENTS 4 TO 8

The magnetic recording media were prepared in the same manner as the first embodiment using the second coating head in which A h was set to +5 μm and the radius of curvature R of the back edge was set to 3, 5, 13, 24, 30 mm as shown in the table 1, and the coating (thickness) unevenness of the back coat layer was measured. The measurement results are shown in the table 1. In the embodiment 4, the coating was performed by selecting 173.6 degrees as a lap angle from a coating-permissible lap-angle range in which the second coating head could perform the coating operation.

COMPARATIVE EXAMPLE 2

The magnetic recording medium was prepared in the same manner as the first embodiment, except that the coating head (as disclosed in Japanese Laid-open Patent Application No. 57-84771) equipped with a triangular-sectional back edge surface having an apex was used as the second coating head, and the coating (thickness) unevenness of the back coat layer was measured. The measurement result is shown in the table 1.

COMPARATIVE EXAMPLES 3 TO 5

The magnetic recording media were prepared in the same manner as the first embodiment using the second coating head in which A h was set to +5 μm and the radius of curvature R of the back edge was set to 2, 40, 90 mm as shown in the table 1, and the coating (thickness) unevenness of the back coat layer was measured. The measurement results are shown in the table 1.

EMBODIMENT 9

The web tension in the first coating lead was set to 15 kg/width, and the magnetic recording medium was prepared in the same manner as the embodiment 3. The coating (thickness) unevenness of the back coat layer was measured, and its result is shown in the table 1.

COMPARATIVE EXAMPLE 6

The magnetic recording medium was prepared in the same manner as the embodiment 3 except for the following condition: no tension control of the vacuum roll 9 was performed. 15 kg/width tension was commonly set for the first and second coating heads, and the coating was carried out while the lap angle of the first coating head was fixed. The coating (thickness) unevenness of the back coat layer was measured and its result is shown in the table 1.

COMPARATIVE EXAMPLE 7

The magnetic recording medium was prepared in the same manner as in embodiment 3 except that the web tension in the first coating head was set to 10 kg/width. The measurement result of the coating (thickness) unevenness of the back coat layer is shown in the table 1.

EMBODIMENTS 10 AND 11, COMPARATIVE EXAMPLES 8 AND 9

The magnetic recording media were prepared in the same manner as the embodiment 1 using the second coating head in which the length $l_2$ of the back edge was set to 0.24, 2.96. 0.13, 3.05 mm as shown in the table 1. The measurement results of the coating (thickness) unevenness of the back coat layer are shown in the table 1. In the embodiment 10, the coating was performed by selecting 176.5 degrees as a lap angle from a coating-permissible lap-angle range in which the second coating head could perform the coating operation.

COMPARATIVE EXAMPLE 10

The sample was prepared by using the coating liquid of the second coating head for the first coating head, and it was used as a comparative sample for the thickness unevenness measurement.

TABLE 1

| MAGNETIC RECORD-ING MEDIUM (*1) | TENSION OF COATING HEAD | | SHAPE OF SECOND COATING HEAD | | | | LAP ANGLE OF FIRST COATING HEAD | | LAP ANGLE OF SECOND COATING HEAD | | CU (*2) (%) | ESTIMATION OF COATING PERFORMANCE |
|---|---|---|---|---|---|---|---|---|---|---|---|---|
| | 1st | 2nd | R (mm) | Δh (*3) (um) | h (um) | $l_2$ (mm) | MINI-MUM (deg.) | MAXI-MUM (deg.) | MINI-MUM (deg.) | MAXI-MUM (deg.) | | |
| | (kg/width) | | | | | | | | | | | |
| E-1 | 20 | 15 | 5 | 0 | 170 | 0.73 | 160.6 | 174.3 | 168.1 | 177.2 | 4.2 | GOOD |
| E-2 | | | 5 | +40 | 210 | 0.73 | | | 168.1 | 176.5 | 4.6 | GOOD |
| E-3 | | | 5 | +70 | 240 | 0.73 | | | 170.9 | 179.3 | 4.7 | GOOD |
| Co-1 | | | 5 | −20 | 150 | 0.73 | | | 170.9 | 177.9 | 12.8 | (*4) |
| E-4 | | | 3 | +5 | 180 | 0.99 | | | 173.6 | 173.6 | 4.5 | GOOD |
| E-5 | | | 5 | +5 | 175 | 0.73 | | | 168.1 | 177.2 | 4.1 | GOOD |
| E-6 | | | 13 | +5 | 25 | 1.00 | | | 175.0 | 177.2 | 2.6 | GOOD |
| E-7 | | | 24 | +5 | 50 | 1.35 | | | 168.1 | 172.6 | 4.3 | GOOD |
| E-8 | | | 30 | +5 | 20 | 1.02 | | | 170.9 | 172.6 | 4.9 | GOOD |
| Co-2 | | | — | — | — | — | | | 152.8 | | 6.8 | (*5) |
| Co-3 | | | 2 | +5 | 270 | 1.00 | | | — | — | — | (*6) |
| Co-4 | | | 40 | +5 | 15 | 0.97 | | | — | — | — | (*6) |
| Co-5 | | | 90 | +5 | 10 | 1.01 | | | — | — | — | (*6) |
| E-9 | 15 | 15 | 5 | +70 | 240 | 0.73 | 157.1 | 159.4 | 170.9 | 179.3 | 4.7 | GOOD |
| Co-6 | | 15 | 5 | +70 | 240 | 0.73 | 157.1 | | 169.5 | 172.6 | 4.8 | (*7) |
| Co-7 | 10 | 15 | 5 | +70 | 240 | 0.73 | — | | 170.9 | 179.3 | 3.8 | (*8) |
| E-10 | 20 | 15 | 18 | +5 | 20 | 0.24 | 160.6 | 174.3 | 176.5 | 176.5 | 4.8 | GOOD |
| E-11 | | | 18 | +5 | 250 | 2.96 | | | 170.9 | 173.6 | 4.9 | GOOD |
| Co-8 | | | 18 | +5 | 10 | 0.13 | | | 177.2 | 177.2 | 8.2 | (*9) |
| Co-9 | | | 18 | +5 | 265 | 3.05 | | | 169.5 | 172.3 | 6.0 | (*9) |
| Co-10 | 15 | 15 | — | — | — | — | 173.0 | 177.3 | — | — | 3.6 | (*10) |

*1 E-: EMBODIMENT, Co-: COMPARATIVE EXAMPLE
*2 CU: COATING UNEVENNESS . . . permissible limit is 5% unevenness in thickness
*3 Δh is represented as + when the slit-side edge point of the back edge is projected toward the web side from the tangential line L.

TABLE 1-continued

| MAGNETIC RECORD- | TENSION OF COATING HEAD | | SHAPE OF SECOND COATING HEAD | | | | LAP ANGLE OF FIRST COATING HEAD | | LAP ANGLE OF SECOND COATING HEAD | | | ESTIMATION OF COATING PERFORMANCE |
|---|---|---|---|---|---|---|---|---|---|---|---|---|
| | | | Δh | | | | | | | | | |
| ING MEDIUM (*1) | 1st (kg/width) | 2nd | R (mm) | (*3) (um) | h (um) | l₂ (mm) | MINI- MUM (deg.) | MAXI- MUM | MINI- MUM (deg.) | MAXI- MUM | CU (*2) (%) | |

*4 WEB SCRAPING OCCURRED ON SECOND SURFACE
*5 STREAKING OCCURRED ON SECOND SURFACE
*6 COATING COULD NOT PERFORMED ON SECOND SURFACE
*7 PERMISSIBLE RANGE WAS NARROW
*8 COATING COULD NOT PERFORMED ON FIRST SURFACE
*9 STRIPED UNEVENNESS IN THICKNESS
*10 SECOND COATING LIQUID WAS COATED BY FIRST COATING HEAD

As shown in the table 1, the embodiments 1 to 11 satisfied the requirement for the back coat layer of the magnetic recording medium, in which unevenness in thickness should be below 5%. In addition, in these embodiments, no scraping of the web was observed and the web itself was excellent.

On the other hand, the comparative example 1 had negative Δh, and a part of the R-surface portion of the back edge surface of the second coating head was located at a position lower than the tangential line L which was drawn to the front edge surface at the slit-side edge point of the front edge. Therefore, the coating (thickness) unevenness was larger, and scraping occurred on the web due to contact between the web and the front edge.

In the comparative example 2, the coating was performed while varying the lap angle of the second coating head to various values. However, the permissible lap angle range was narrow, and streaking occurred on the coated film even for the coating at the lap angle of 152.8 degrees which was a value of the permissible range. Therefore, no excellent back coat layer was obtained.

No coating of the back coat layer by the second coating head could be performed in the comparative examples 3 to 5. In the comparative example 6, a coating-permissible lap-angle range of the second coating head (i.e., a lap-angle range in which the second coating head could perform the coating) was narrow, and adjustment of the lap angle of the first coating head necessarily caused adjustment of the lap angle of the second coating head, so that the operation became cumbersome. In the comparative example 7, the tension of the first coating head was excessively low, and no coating could be performed by the first coating head. Further, in the comparative example 8, the coating was performed while varying the lap angle of the second coating head to various values. However, the coating-permissible lap-angle range was narrow, and striped unevenness in thickness occurred on the coated film due to low working precision of the back edge even for the coating at the lap angle of 177.2 degrees which was a value of the permissible range. Accordingly, the thickness unevenness was greatly out of the standard. In the comparative example 9, a secondary metering occurred on the back edge (i.e., secondary restriction was imposed on the coating by the back edge) because the back edge was excessively long. Therefore, the thickness unevenness was large and out of the standard.

As described above, according to the coating method and the coating apparatus of the present invention, a uniform coating can be performed with no effect of vibration which occurs in the web through the air-float drying process. Even when the coating is performed on both sides of a web, it is unnecessary to repetitively carry out the coating on each side of the web, totally twice, so that the number of steps can be reduced and thus the yield can be improved. In addition, the coating apparatus of this invention requires no additive equipments such as a vibration absorbing device for removing the vibration occurring in the web through the air-float drying process and a solid smoother, so that the manufacturing cost can be reduced as a whole.

This invention is not limited to the above embodiments, and various modifications may be made without departing from the subject matter of this invention. Accordingly, the present examples and embodiments are to be considered as illustrative and not restrictive, and the invention is not to be limited to the details given herein, but may be modified within the scope of the appended claims. Further, any modification and alteration which are equivalent to the scope of the appended claims are within the scope of the appended claims.

What is claimed is:

1. A coating method for uniformly coating a running web with coating liquid, comprising the steps of:

exclusively disposing an extrusion coating head between a drier performing a non-contact drying operation and a support roll which is located at an upstream side of said drier and nearest to said drier, said extrusion coating head having a back edge surface located at a downstream side of a web feeding direction, said back edge surface having one of a rounded and curved surface which has a radius of curvature R satisfying the following inequality: $3 \text{ mm} \leq R \leq 30 \text{ mm}$, wherein the entire rounded-surface portion of said back edge of said coating head is located at a position higher than a tangential line which is drawn to a front edge surface at a slit-side edge point of said front edge so as to project toward a web side;

uniformly coating the running web with the coating liquid from at least said extrusion coating head; and performing the non-contact drying operation with said drier after the coating of the coating liquid on the running web.

2. The coating method as claimed in claim 1, wherein said back edge has a length of from 0.2 to 3 mm.

3. The coating method as claimed in claim 1, wherein said back edge has a length of from 0.4 to 3 mm.

4. The coating method as claimed in claim 1, wherein said back edge surface projects toward the web side from the tangential line by a height of from 20 to 300 μm.

5. The coating method as claimed in claim 1, wherein at least one coating head is disposed at an upstream side of said extrusion coating head nearest to said drier.

6. The coating method as claimed in claim 5, wherein a tension of the web in each coating section in which each coating head is disposed is set independently.

7. The coating method as claimed in claim 6, wherein the tension of the web in the coating section in which said extrusion coating head nearest to said drier is disposed is equal to or smaller than the tension of the web in the other coating section in which the other coating head is disposed.

8. The coating method as claimed in claim 7, wherein the tension of the web in the coating section in which said extrusion coating head nearest to said drier is disposed is set from 5 to 50 kg/m.

9. The coating method as claimed in claim 5, wherein a lap angle of each of said coating heads is set independently.

10. The coating method as claimed in claim 9, wherein a tension of the web in each coating section in which each coating head is disposed is set independently.

11. The coating method as claimed in claim 10, wherein the tension of the web in the coating section in which said extrusion coating head nearest to said drier is disposed is equal to or smaller than the tension of the web in the other coating section in which the other coating head is disposed.

12. The coating method as claimed in claim 11, wherein the tension of the web in the coating section in which said extrusion coating head nearest to said drier is disposed is set from 5 to 50 kg/m.

13. The coating method as claimed in claim 1, wherein a slit-side edge point of the back edge projects toward the web side from the tangential line by a distance of from 0 to 100 μm.

14. A coating apparatus for uniformly coating a running web with a coating liquid, which comprises:
a web feeding device;
a drier performing a non-contact drying operation; and
an extrusion coating head uniformly coating the web which is exclusively disposed between said drier and a support roll which is located at an upstream side of said drier and nearest to said drier, wherein said extrusion coating head has a back-edge surface located at a downstream side of a web feeding direction which is designed to have a round surface which has a radius of curvature R which satisfies the following inequality: 3 mm≦R≦30 mm, and the entire rounded-surface portion of said back edge of said coating head is located at a position higher than a tangential line drawn to a front edge surface at a slit-side edge point of the front edge so as to project toward a web side.

15. The coating apparatus as claimed in claim 14, wherein said back edge of said extrusion coating head has a length of from 0.2 to 3 mm.

16. The coating apparatus as claimed in claim 14, wherein said back edge of said extrusion coating head has a length of from 0.4 to 3 mm.

17. The coating apparatus as claimed in claim 14, wherein said back edge surface projects from the tangential line toward the web side by a height of from 20 to 300 μm.

18. The coating apparatus as claimed in claim 14, wherein a slit-gap width of said slit formed between said back edge and said front edge of said extrusion coating head is set from 0.05 to 0.6 min.

19. The coating apparatus as claimed in claim 14, further including at least one coating head located at an upstream side of said extrusion coating head nearest to said drier.

20. The coating apparatus as claimed in claim 19, wherein said at least one coating head coats a first side of the web and said extrusion coating head coats a second side of the web.

21. The coating apparatus as claimed in claim 19, wherein said coating head coats the coating liquid on one side of the web in a multilayer form.

22. The coating apparatus as claimed in claim 19, further including tension adjusting means including a plurality of adjusters, each of said adjusters individually and independently adjusting the tension of the web in each coating section in which each coating head is disposed.

23. The coating apparatus as claimed in claim 14, wherein said extrusion coating head comprises a multilayer coating head having two slits between said back edge and said front edge.

24. The coating apparatus as claimed in claim 23, further including at least one coating head located at an upstream side of said extrusion coating head.

25. The coating apparatus as claimed in claim 24, wherein said at least one coating head coats a first side of the web and said extrusion coating head coats a second side of the web.

26. The coating apparatus as claimed in claim 24, further including a tension adjuster, said adjuster individually and independently adjusting the tension of the web in each coating section in which each coating head is disposed.

27. The coating apparatus as claimed in claim 14, wherein a slit-side edge point of the back edge projects from the tangential line toward the web side by a distance of from 0 to 100 μm.

* * * * *